United States Patent [19]
Adachi

[11] Patent Number: 5,295,024
[45] Date of Patent: Mar. 15, 1994

[54] METHOD AND APPARATUS FOR TWO-CHANNEL RECORDING OF VIDEO SIGNALS

[75] Inventor: Makoto Adachi, Nikko, Japan

[73] Assignee: Sharp Kabushiki Kaisha, Osaka, Japan

[21] Appl. No.: 704,385

[22] Filed: May 23, 1991

[30] Foreign Application Priority Data

Nov. 21, 1990 [JP] Japan ................... 2-319374

[51] Int. Cl.$^5$ .................................................. H04N 5/78
[52] U.S. Cl. ................................. 360/36.2; 360/32; 360/8; 358/339
[58] Field of Search .............. 360/32, 8, 33.1, 36.1, 360/36.2, 11.1; 358/335, 337, 339, 148, 150, 153, 319, 320

[56] References Cited

U.S. PATENT DOCUMENTS

| | | | |
|---|---|---|---|
| 4,558,377 | 12/1985 | Collins et al. | 360/36.2 X |
| 4,733,312 | 3/1988 | Morimoto | 360/36.1 X |
| 4,774,599 | 9/1988 | Baumeister | 360/11.1 |
| 4,780,769 | 10/1988 | Numakura et al. | 358/320 |
| 4,783,703 | 11/1988 | Murakoshi et al. | 360/11.1 X |
| 4,783,704 | 11/1988 | Funston | 360/11.1 |
| 4,802,025 | 1/1989 | Shinada | 360/36.1 X |
| 4,835,620 | 5/1989 | Sakamoto | 360/36.1 X |
| 4,939,593 | 7/1990 | Yuuohi et al. | 360/11.1 |

FOREIGN PATENT DOCUMENTS

| | | |
|---|---|---|
| 0234483 | 9/1987 | European Pat. Off. . |
| 62-190981 | 8/1987 | Japan . |
| 62-196985 | 8/1987 | Japan . |
| 2086691 | 10/1981 | United Kingdom . |

Primary Examiner—Andrew L. Sniezek

[57] ABSTRACT

A video signal recording apparatus is provided with first and second channels for transmitting an input video signal. The first channel has a line memory for conducting a 1H delay on data and a time-base-extension line memory for conducting time base extension on the data with the 1H delay. The data subjected to the time base extension undergoes D/A conversion to be an output of the first channel. On the other hand, the second channel does not have a line memory for a 1H delay, and the video signal without delay is subjected, to time base extension and undergoes D/A conversion to be an output of the second channel. In the arrangement, odd lines and even lines respectively contained in adjoining two frames in each channel are reversed such that in a certain frame, odd lines of the input video signal are transmitted through the first channel with even lines through the second channel. In the next frame, even lines are transmitted through the first channel with odd lines through the second channel. Thus, influences on the reproduced picture due to the difference of circuit characteristics is averaged and the perception of unevenness of color or brightness is avoided.

2 Claims, 2 Drawing Sheets

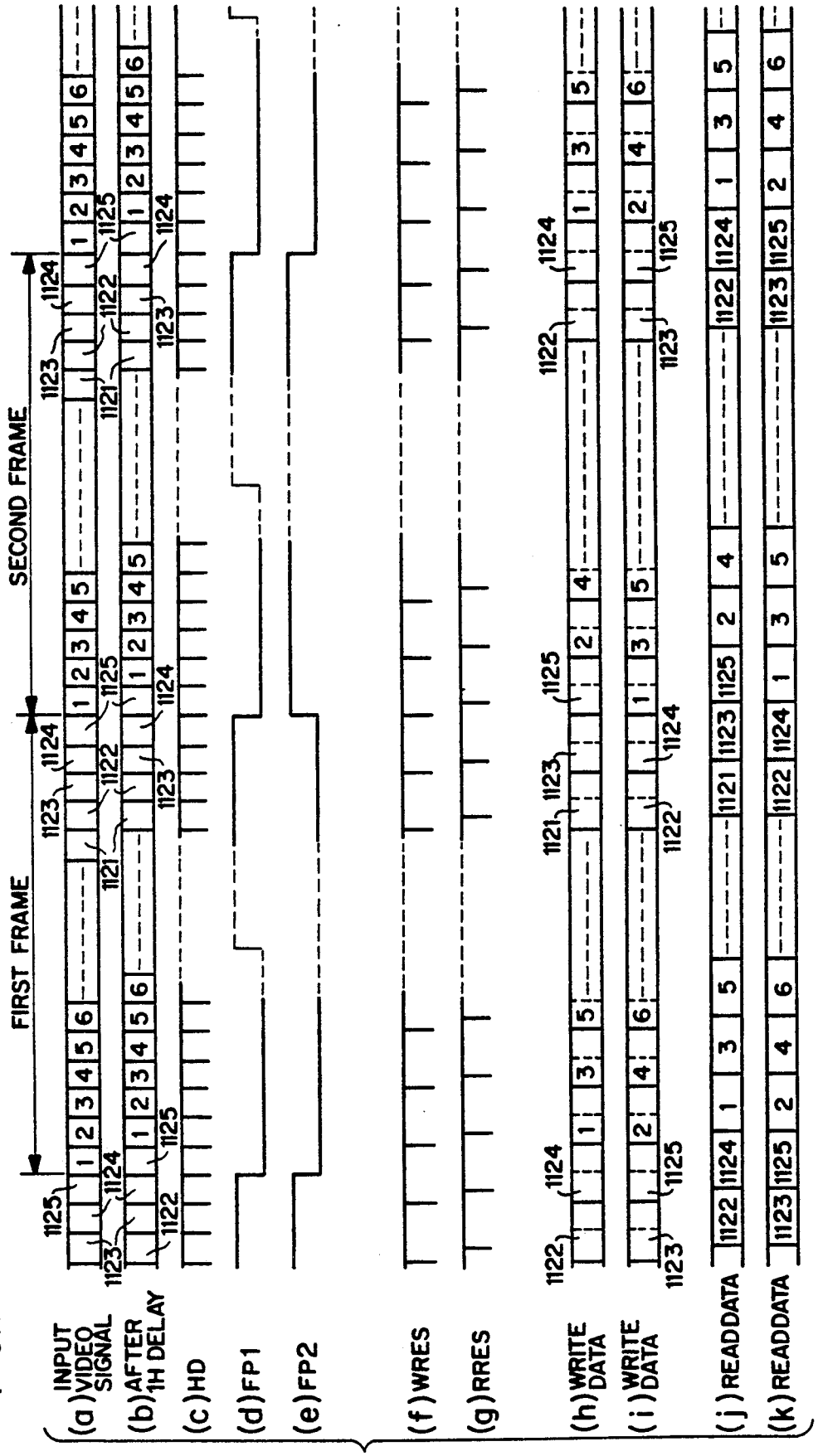

METHOD AND APPARATUS FOR TWO-CHANNEL RECORDING OF VIDEO SIGNALS

BACKGROUND OF THE INVENTION

1. FIELD OF THE INVENTION

The present invention relates to a video signal recording apparatus for recording a video signal with wideband, such as VTRs (Video Tape Recorders) applicable to EDTVs (Edited Definition Television), HDTVs (High Definition Television) or MUSE (Multiple Sub-Nyquist Sampling Encoding), which have been developed in Japan.

2. DESCRIPTION OF THE BACKGROUND ART

For apparatuses for recording a video signal with widebrand, such as HDTVs in Japan, it is known in the art that in recording the video signal, the video signal is arranged to undergo time base extension processing and to be divided into two channels to record (see for example, Japanese Laid-Open Patent Applications 62-196985 and 62-190981). When recordings are made in this manner, for example, with respect to an input video signal with a bandwidth of 8 MHz, an occupied bandwidth required is lessened to 4 MHz, one-half of 8 MHz, by conducting double time base extension of the input signal.

However, since the time base extension is doubled, time deviations will be produced unless the signal is divided into two channels. This recording method is thus adopted in the case where there is little room for bandwidth in a recording-reproduction system.

In a recording apparatus wherein the above method is adopted, however, there are often presented problems related to a difference of circuit characteristics caused by variations in two groups of circuit devices employed in the respective two channel systems.

More concretely, where there is a difference of circuit characteristics between two systems, a problem is presented in that adverse effects such as differences in brightness or color occur in every horizontal scanning period (1 line : 1 H) on a reproduced picture, thereby making a picture image on the screen much less clear.

SUMMARY OF THE INVENTION

It is an object of the present invention to provide a video signal recording apparatus wherein unclear picture images caused by differences in brightness or tone on a reproduced picture are avoided, regardless of variations in circuit elements employed therein.

In order to achieve the above object, a video signal recording apparatus of the present invention comprises a first channel and a second channel for transmitting an input video signal; and means which, in transmitting a certain frame of the video signal including odd lines and even lines, transmits the odd lines through the first channel while transmitting the even lines through the second channel, and in transmitting the next frame including odd lines and even lines, transmits the even lines through the first channel while transmitting the odd lines through the second channel.

With the above arrangement, even if there is a difference of circuit characteristics between the first and second channels, an arrangement of the odd lines and even lines respectively contained in adjoining two frames in each channel is reversed. Therefore, a difference of circuit characteristics between the first and second channels becomes inconspicuous on a reproduced picture.

Additionally, the above first and second channels may be constituted by, for example, line memories.

Further scope of applicability of the present invention will become apparent from the detailed description given hereinafter. However, it should be understood that the detailed description and specific examples, while indicating preferred embodiments of the invention, are given by way of illustration only, since various changes and modifications whithin the spirit and scope of the invention will become apparent to those skilled in the art from this detailed description.

BRIEF DESCRIPTION OF THE DRAWINGS

For a fuller understanding of the nature and advantages of the invention, reference should be made to the ensuing detailed description taken in conjunction with the accompanying drawings which are given by way of illustration only, and thus are not limitative of the present invention, and wherein:

FIGS. 1 and 2 illustrate a first embodiment of the present invention.

FIG. 1 is a block diagram illustrating essential parts of the circuit configuration of a video signal recording apparatus according to the present invention.

FIG. 2 is a timing chart with regard to the essential parts of FIG. 1.

PREFERRED EMBODIMENT

Figure 1:
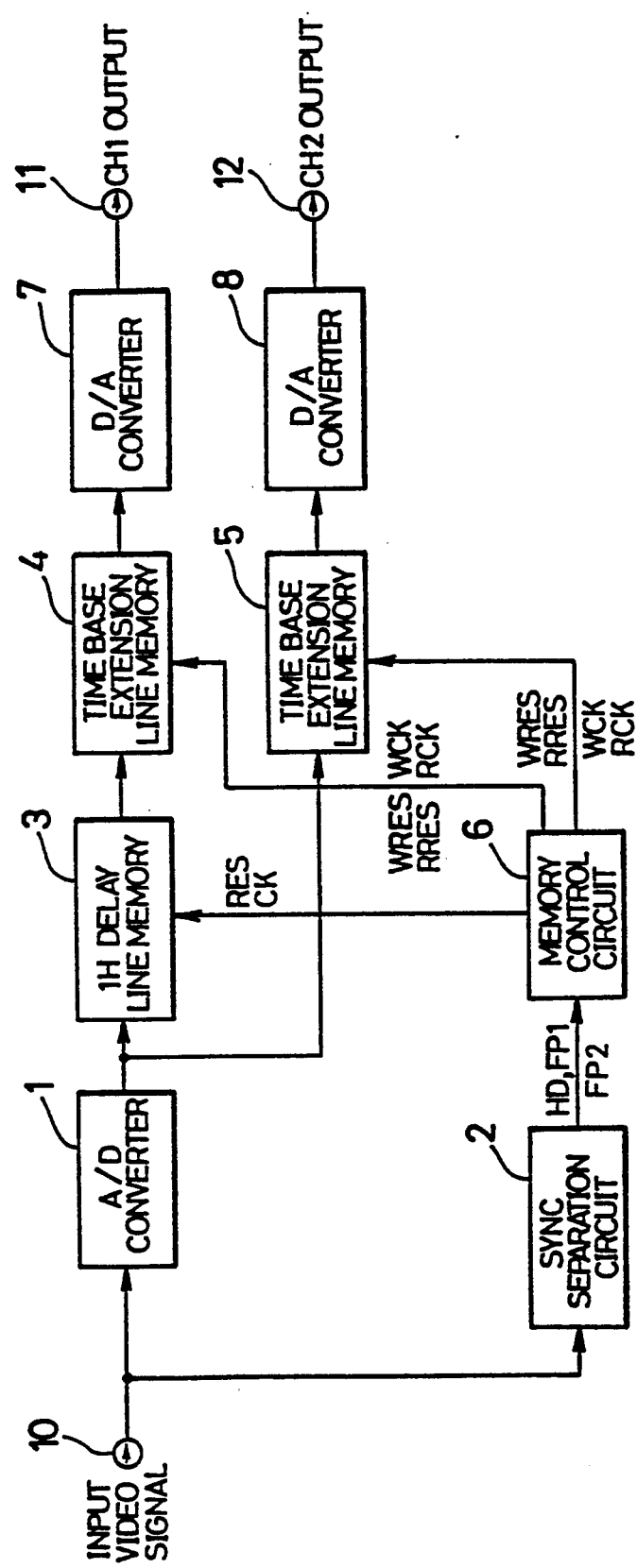

Referring to FIGS. 1 and 2, the following description concerns one embodiment of the present invention. In addition, the description is given of, for example, an HDTV used in Japan, wherein one frame is composed of 1125 scanning lines.

In a video signal recording apparatus of the present invention, which has a configuration as shown in FIG. 1, a video signal is input to an A/D converter 1 through a terminal 10, and further input to a sync separation circuit 2. The sync separation circuit 2 is designed to separate a horizontal synchronizing signal HD from the video signal entered thereto, and to produce a frame pulse FP1 having a cycle of one frame and a frame pulse FP2 having a cycle of two frames.

The video signal, converted into digital data by the A/D converter 1, is entered to a line memory 3 (first line memory means, delay means), where the video signal is subject to a delay of 1H (horizontal scanning period), and then entered to a line memory 4 (second line memory means). In the line memory 4 the signal entered thereto undergoes time base extension, and is entered to a D/A converter 7 (first D/A conversion means), where it is converted into analog data to be released as a signal of a first channel (CH1). As described above, the first channel includes the line memory 3, line memory 4 and D/A converter 7.

The video signal, converted into digital data by the A/D converter 1, is also entered to a line memory 5 (third line memory means) without undergoing the delay, where it undergoes time base extension, and then entered to a D/A converter 8 (second D/A conversion means), where it is converted into analog data to be released as a signal of a second channel (CH2). As described above, the second channel includes the line memory 5 and D/A converter 8.

A memory control circuit 6 (line memory control means) produces a reset pulse RES and a clock pulse CK responsive to the horizontal synchronizing signal HD as an output of the sync separation circuit and pulse signals of the 1-frame pulse FP1 and the 2-frame- pulse FP2, and releases those pulses to the line memory 3 for a 1H delay. The reset pulse RES and clock pulse CK (both referred to as first control signals) are used for controlling the line memory 3 to conduct a 1H delay on the input signal.

Moreover, the memory control circuit 6 produces a write reset pulse WRES, a read reset pulse RRES, a write clock pulse WCK and a read clock pulse RCK responsive to the horizontal synchronizing signal HD and the pulse signals of the 1-frame pulse FP1 and 2-frame pulse FP2, each released from the sync separation circuit 2, and releases those pulses to the line memories 4 and 5 respectively for time base extension. Here, for example, if the read clock pulse RCK has a frequency of one-half, the frequency of the write clock pulse WCK, double time base extension is achieved. In addition, second and third control signals are respectively composed of the write reset pulse WRES, read reset pulse RRES, write clock pulse WCK and read clock pulse RCK.

The video data having been read based on the read clock pulse RCK and subject to double time base extension, is converted into analog data respectively in the D/A converters 7 and 8, and then recorded on a recording medium (not shown) such as a magnetic tape through respective output terminals 11 and 12, low-pass filters, modulators, recording amplifiers and other devices (neither shown).

Next, referring to FIG. 2, the following description will discuss, in detail, timing control of the circuits shown in FIG. 1. FIG. 2(a) shows a video signal (input signal of the line memory 3) having been converted into digital data in the A/D converter 1. FIG. 2(b) shows the video signal converted into a digital signal, after having been subject to a delay of one line (1H) in the line memory 3. Here, figures in the drawing respectively indicate numbers of horizontal scanning lines.

When the video signal is entered to the sync separation circuit 2 via the terminal 10, a horizontal synchronizing signal HD (see FIG. 2(c)) is separated from the input video signal, while a frame pulse FP1 (see FIG. 2(d)) and a frame pulse FP2 (see FIG. 2(e)) are generated and released.

Based on the output signals from the sync separation circuit 2, the memory control circuit 6 releases a write reset pulse WRES shown by FIG. 2(f) and a read reset pulse RRES shown by FIG. 2(g) to the line memories 4 and 5 for time base extension.

The write reset pulse WRES indicates a start point for writing, and therefore data is written in the line memories 4 and 5 respectively with predetermined timing shown by FIG. 2(f) (see FIGS. 2(h) and 2(i)). The read reset pulse RRES indicates a start point for reading out, and when reading operation is performed with predetermined timing shown by FIG. 2(g), data is read out as shown in FIGS. 2(j) and 2(k).

Neither the write clock pulse WCK nor the read clock pulse RCK is shown in the drawings; yet the frequency of the read clock pulse RCK is set to one-half the frequency of the write clock pulse WCK.

Through the first channel 1 (CH1), as shown in FIG. 2(j), odd lines are allocated to the first frame while even lines are allocated to the second frame. On the other hand, through the second channel 2 (CH2), as shown in FIG. 2(k), even lines are allocated to the first frame while odd lines to the second frame.

Thus, each frame of the input video signal is alternately transmitted through the first and second channels. Therefore, the n-th line of the video signal (where n is a natural number; $1 \leq n \leq 1125$) is alternately transmitted through the first and second channel (CH1 and CH2), and even if there is a difference of circuit characteristics between the first and second channels (CH1 and CH2), it is averaged in vision on the picture, and thereby it is avoided that the difference is perceived as unevenness of color or brightness.

As described above, a video signal recording apparatus of the present invention is characterized in comprising the first and second channels for transmitting a video signal and means for reversing an arrangement of the odd lines and even lines respectively contained in adjoining two frames in each channel such that in a certain frame, odd lines of the input video signal are transmitted through the first channel with even lines through the second channel, and in the next frame, even lines are transmitted through the first channel with odd lines through the second channel.

Therefore, even if there is a difference of circuit characteristics between the first and second channels, the odd lines and even lines of a signal forming a picture are transmitted to every frame through the alternately changing different channel such that each frame has the respective characteristics of the first and second channels. Thus, adverse effects due to a difference of circuit characteristics between the first and second channels are averaged, and it is avoided that the difference is perceived as unevenness of color or brightness.

Accordingly, since it is not necessary to provide a special circuit for eliminating the difference of characteristics between the two channels, low cost of the apparatus can be achieved.

The invention being thus described, it may be obvious that the same may be varied in many ways. Such variations are not to be regarded as a departure from the scope of the invention.

What is claimed is:

1. A video signal recording apparatus comprising:

A/D conversion means for converting an input video signal into digital data;

sync separation means for separating a horizontal synchronizing signal from the input video signal and generating a first frame pulse having a cycle of one frame and a second frame pulse having a cycle of two frames;

line memory control means for outputting first, second and third control signals based on the horizontal synchronizing signal, the first frame pulse and the second frame pulse;

first line memory means for delaying an output of said A/D conversion means one horizontal scanning period according to the first control signal;

second line memory means for extending a time base of an output of said first line memory means according to the second control signal;

third line memory means for extending a time base of an output of said A/D conversion means according to the third control signal;

first D/A conversion means for converting an output of said second line memory means into first analog data; and second D/A conversion means for converting an output of said third line memory means into second analog data, the input video signal being recorded in two channels on a recording medium based on the first and second analog data.

2. The video signal recording apparatus as set forth in claim 1, wherein the first control signal includes a reset pulse and a clock pulse, and each of the second and third control signals include a write reset pulse indicating a start point for writing data, a read reset pulse indicating a start point for reading out data, a write clock pulse and a read clock pulse, the read clock pulse having a frequency one-half a frequency of the write clock pulse so as to doubly extend a time base of respective signals input to said second and third line memory means.

* * * * *